United States Patent [19]

Russo

[11] Patent Number: 5,336,002
[45] Date of Patent: Aug. 9, 1994

[54] ONE-HANDED ALPHANUMERIC KEYBOARD AND METHOD

[76] Inventor: Malcolm G. Russo, 1810 W. Colonial Dr., Orlando, Fla. 32804

[21] Appl. No.: 946,843

[22] Filed: Sep. 18, 1992

[51] Int. Cl.$^5$ .............................................. B41J 5/10
[52] U.S. Cl. .................................. 400/489; 400/476; 400/485; 400/486
[58] Field of Search ............... 400/472, 473, 476, 480, 400/485, 486, 489

[56] References Cited

U.S. PATENT DOCUMENTS

| | | | |
|---|---|---|---|
| 3,698,533 | 10/1972 | Illig et al. | 400/486 |
| 3,847,263 | 11/1974 | X | 400/486 |
| 3,920,979 | 11/1975 | Kilby et al. | 400/486 |
| 4,324,976 | 4/1982 | Lapeyre | 400/472 |
| 4,344,069 | 8/1982 | Prame | 400/485 |
| 4,669,903 | 6/1987 | Herzog et al. | 400/486 |
| 5,059,048 | 10/1991 | Sirkin | 400/486 |
| 5,073,054 | 12/1991 | McDowell | 400/486 |
| 5,087,910 | 2/1992 | Guyot-Sionwest | 400/489 |

Primary Examiner—Edgar S. Burr
Assistant Examiner—John S. Hilten
Attorney, Agent, or Firm—Allen, Dyer, Doppelt, Franjola & Milbrath

[57] ABSTRACT

Alphanumeric keyboards are described for use with one hand to enter data. Each keyboard includes a plurality of individually movable alphanumeric keys that are each assigned a different letter of the alphabet. The keys are positioned side-by-side in multiple rows such that when four fingers of one hand are positioned over a home position, these fingers can depress all the letters by moving less than three key positions from the home position. Specialized key features are provided on the keyboard to facilitate the execution of multi-key combinations.

A right-hand keyboard and a left-hand keyboard are disclosed as interchangeable with a conventional keyboard in a supporting shell. Alternatively, both the right-hand and left-hand keyboards are supported on opposite sides of a common rotatable member pivotably mounted in the supporting shell.

7 Claims, 19 Drawing Sheets

ONE-HANDED ALPHANUMERIC KEYBOARD AND METHOD

BACKGROUND OF THE INVENTION

The present invention relates to data entry keyboards and more particularly to manually activated keyboards for use with one hand, which minimize operator fatigue and maximize efficiency.

In nearly every sector of business, work activities center around the use of computer and data entry systems. These systems incorporate electronic keyboards with the standard QWERTY key arrangement for data entry (referring to standard keyboards that contain the letters Q-W-E-R-T-Y beginning at the upper left end of the second row from the top). However, there is a large segment of our global society which is shut out of employment opportunities in fields which require the efficient use of standard keyboards for data entry—namely those who, for various reasons, only have the use of one hand.

A number of one-handed keyboard designs have been proposed for various applications. Examples of these one-handed keyboard designs are disclosed in U.S. Pat. Nos. 4,042,777, 4,615,629, and 4,849,732. Many of the prior art one-handed designs require that two or more keys be depressed simultaneously to control the sequence of characters being generated; that is, to generate each letter of the alphabet, multiple keys must be depressed.

Other keyboards, such as those disclosed in the U.S. Pat. No. 4,615,629, have each letter assigned to an individual key, with the keys spread across the keyboard. When the operator accesses the keys on such a keyboard, the operator's fingers do not depress these keys in a precise manner. In addition, because the alphanumeric keys are spread over the keyboard, the fingers must stretch to access the keys, resulting in the hand moving away from a home position. This hand movement is fatiguing and prevents rapid access of all of the letters.

While some of these designs have merit in terms of improved ergonometric design and input efficiency, they do not meet the immediate need of providing a system which, while permitting one-handed operation, is easily learned with minimum intimidation by operators accustomed to standard QWERTY keyboard design.

Therefore, the availability of a one-hand keyboard which maintains the physical arrangement of the current standard QWERTY configuration as much as possible while facilitating one-hand operation, would greatly benefit those who have previously learned or have some familiarity with two hand typing on the standard QWERTY keyboard and, either by choice or necessity, have need for one hand operation. This group includes those who have become disabled after learning standard typing techniques as well as those who would find advantage in the ability to type efficiently with one hand while having the other hand free, such as Computer Aided Design (CAD), Process Control, or Medical Diagnostic system operators who use keyboards in conjunction with digitizer pads, mouse systems, control devices, or sonographic/radiographic instruments. In addition to the needs of those having the use of only one hand, there exists another work place problem related to keyboards. The extended duration of manual data entry required by many work situations has resulted in "repetitive strain injuries" such as Carpal Tunnel Syndrome becoming one of the leading categories of work place injury. While neither the cause nor the cure for these major debilitating injuries has been identified, it seems apparent to this inventor that there is a high probability that a scenario common to many stress/strain injuries is at work here:

1) The task and work situation is one which does not allow for interruption or delay on the part of the worker even when suggested by the pain and discomfort symptoms of physical strain.

2) Typically, permanent injuries are avoidable if the activity causing the physical strain is discontinued for a reasonable time to allow fatigued muscles to rest and recover.

3) What is a non-permanent strain injury becomes a permanent non-reversible injury when the activity causing the physical strain is continued far beyond the first symptoms of pain or discomfort.

Therefore, the ability to continue data entry activities with one hand while resting the other hand and then changing hands when the first hand becomes fatigued would accomplish the requirements of continued work production while avoiding what is possibly the primary cause of repetitive strain injury—the condition of extended strain duration without rest. The present invention provides a form of full function data entry keyboard consisting of easily selectable left- and right-hand keyboard shells which accomplish the required hand-changing facility.

SUMMARY OF THE INVENTION

A principal object of this invention is to provide an improved method and apparatus for typing with one hand all the English alphabet characters, numbers, and commonly used grammatical symbols.

It is another object of this invention to place letters on a keyboard in a position that minimizes the physical work effort expended in typing typical documents.

Another object of this invention is to place alphanumeric keys on a keyboard in positions where each of the letters in the alphabet can be accessed by the hand in a single finger movement.

A further object of this invention is to assign letters and symbols to keys on a keyboard based on standard frequency statistics for the English language to minimize work by the fingers to access the keys.

An additional object of the invention is to place keys within the normal span of the human hand so that keyboard symbol access does not exceed more than five inches from the small finger to the first finger, thereby increasing productivity when typing with one hand.

Another principal object of the invention is to provide a technique for simultaneous entry of multiple characters, thereby increasing control entry capability by a single hand.

A further object of the invention is to position alpha characters on a keyboard so that a typist can extend his or her fingers on one hand less than three character positions from the home position and still access all the letters of the alphabet.

An additional object of this invention is to provide a method of entering data with a keyboard using a single hand to minimize physical work effort when typing typical documents.

Another principal object of the invention is to provide a manually activated full-function keyboard with a central one-hand shell that incorporates a method of easily changing from one version to the other version of the two basic one-hand keyboard designs.

These and other objects are provided with a manually activated keyboard for use with either the right or left hand. The keyboard includes a plurality of individual manually movable alphanumeric keys, each operative to indicate a different letter of the alphabet when depressed. The keys are preferably positioned side by side on the keyboard in parallel juxtaposed rows such that when the fingers of the hand rest on the keys in the center of the rows, the fingers on one hand can depress all the alphanumeric keys by moving less than three key positions from the center row. By moving less than three key positions, the physical work effort exerted is minimized.

In another embodiment of the invention a method for entering simultaneous key combinations employs the steps of depressing a multi-combination key on the keyboard and then depressing a sequence of keys on the keyboard after depressing the multi-combination key. The multi-combination key is then depressed a second time after the sequence of keys has been depressed. An indication that a simultaneous key combination has been depressed corresponding to the sequence of keys is provided when the multi-combination key is depressed for the second time. The multi-combination key then allows simultaneous key combinations to be provided simply and efficiently with one hand.

Another form of the invention provides an enhancement in the operation of the previously described multi-combination key. In this arrangement, two key combinations are entered quickly by depressing a two-combination key on the keyboard and then depressing a two key sequence of keys after depressing the two-combination key. The selected combination of two keys is then simultaneously entered at the time the second key is selected without the need to depress the two-combination key a second time. The two-combination key allows the entry of two-key simultaneous combinations which would otherwise be beyond the span of a single hand on a standard 101-key keyboard.

THE DRAWINGS

Figure 1:
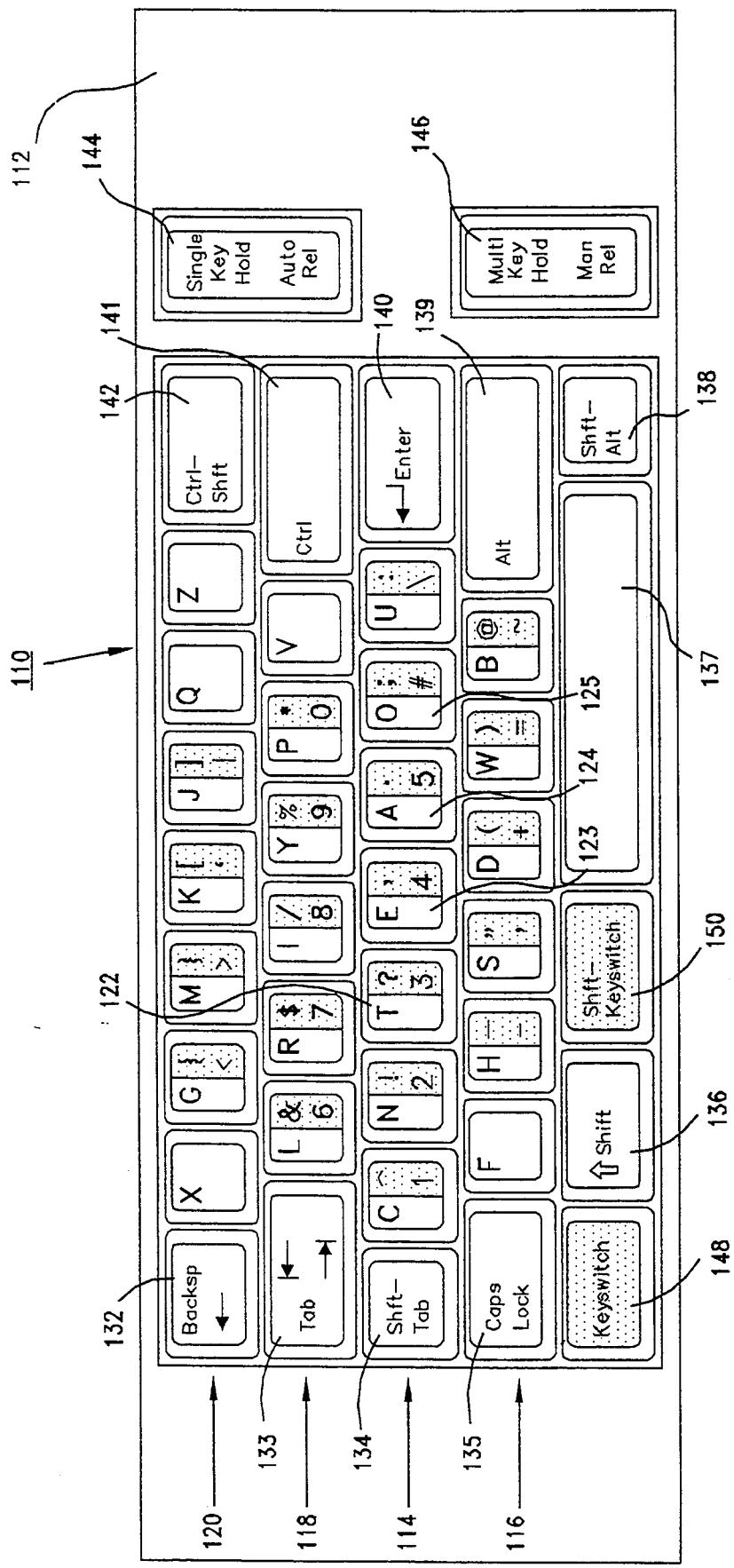
FIG. 1 is a top plan view illustrating a single handed, right-hand keyboard with alphanumeric keys positioned in accordance with the present invention.
Figure 3:
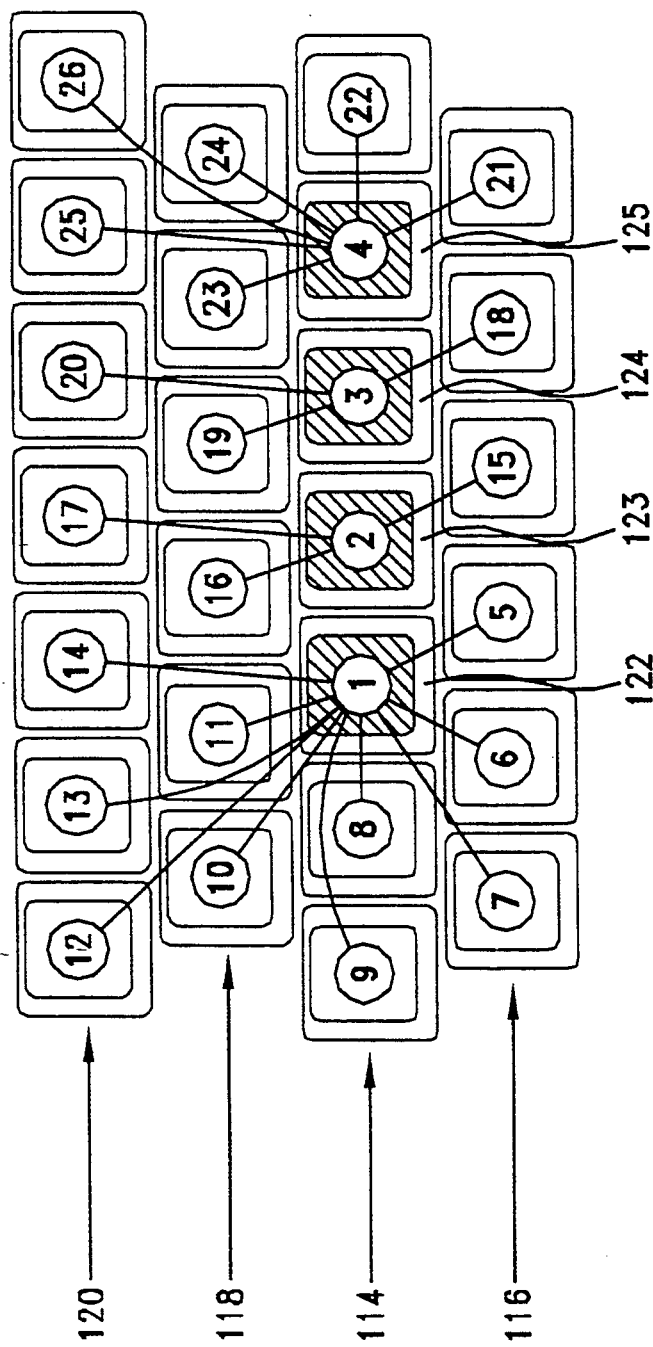
FIG. 3 is another top plan view of a single handed, right-hand keyboard like that of FIG. 1, illustrating finger stroke paths with arrows, with the finger "home" keys indicated by shading and with encircled numerals 1 through 26 providing arbitrary reference identification for each key.
Figure 4:
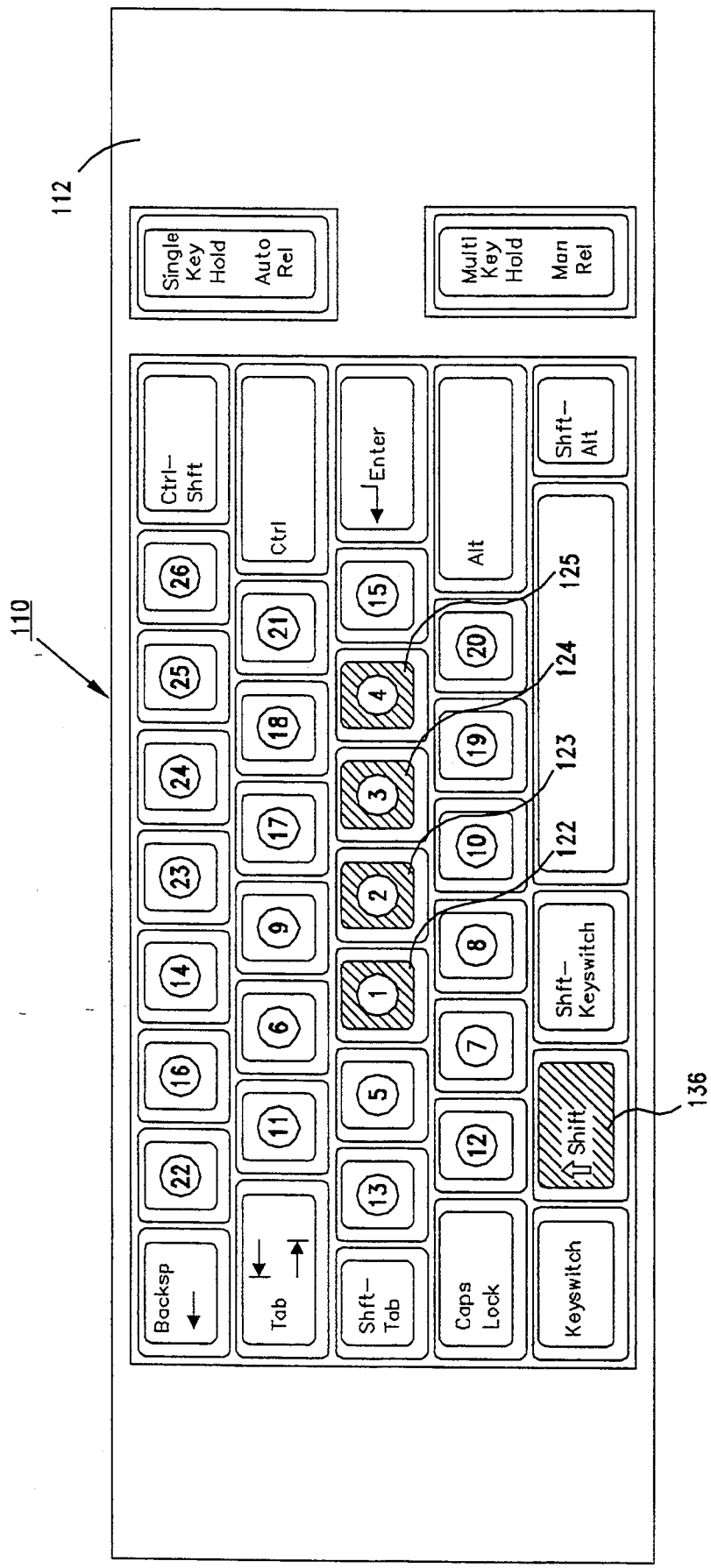

FIG. 4 is another top plan view of a right-hand keyboard like that shown in FIGS. 1 and 3, using Arabic numbers 1 through 26 to indicate optimum letter key sequence, and with the "home" keys indicated by shading.

Figure 2:
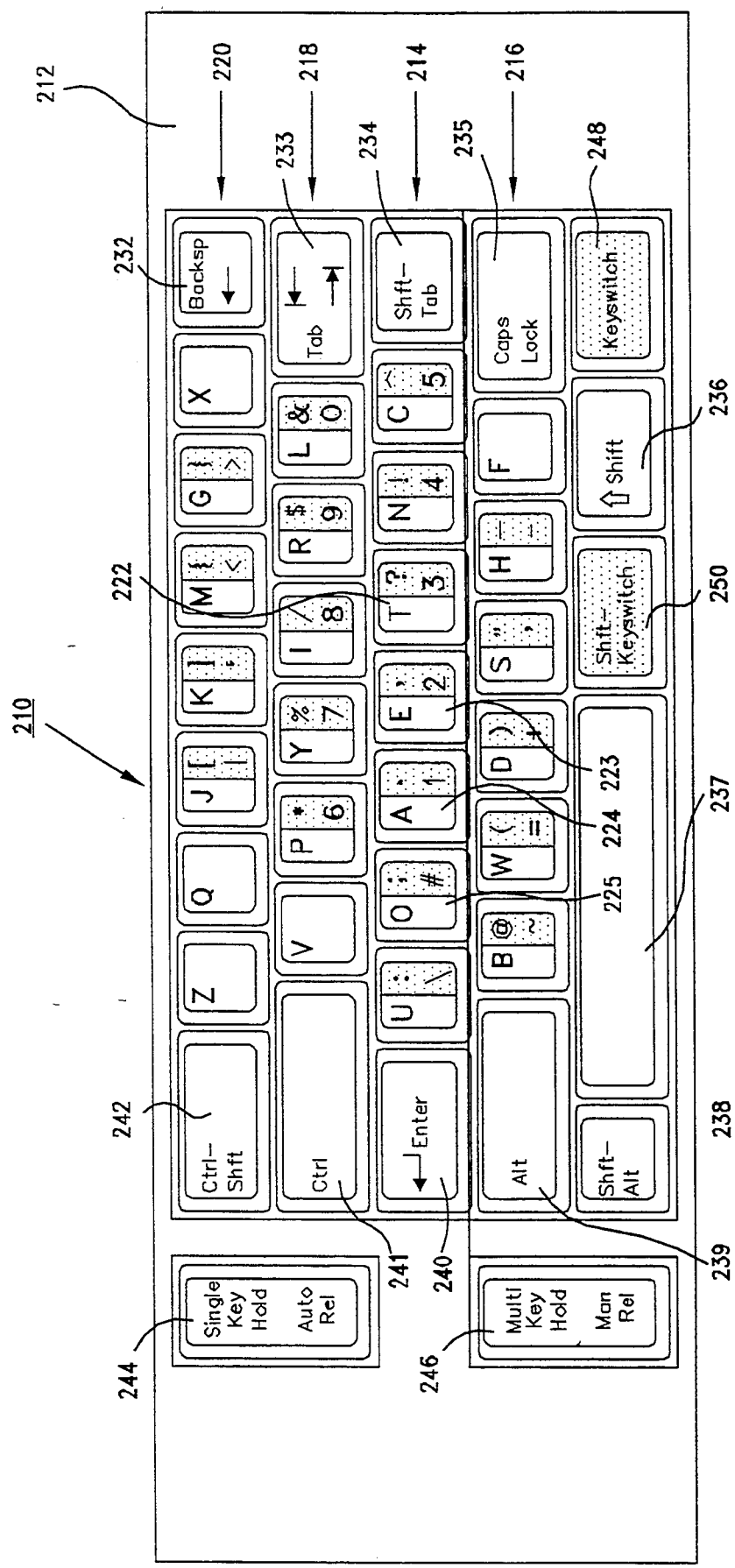
FIG. 2 is a top plan view illustrating a single handed, left-hand keyboard with alphanumeric keys positioned in accordance with the present invention.
Figure 5:
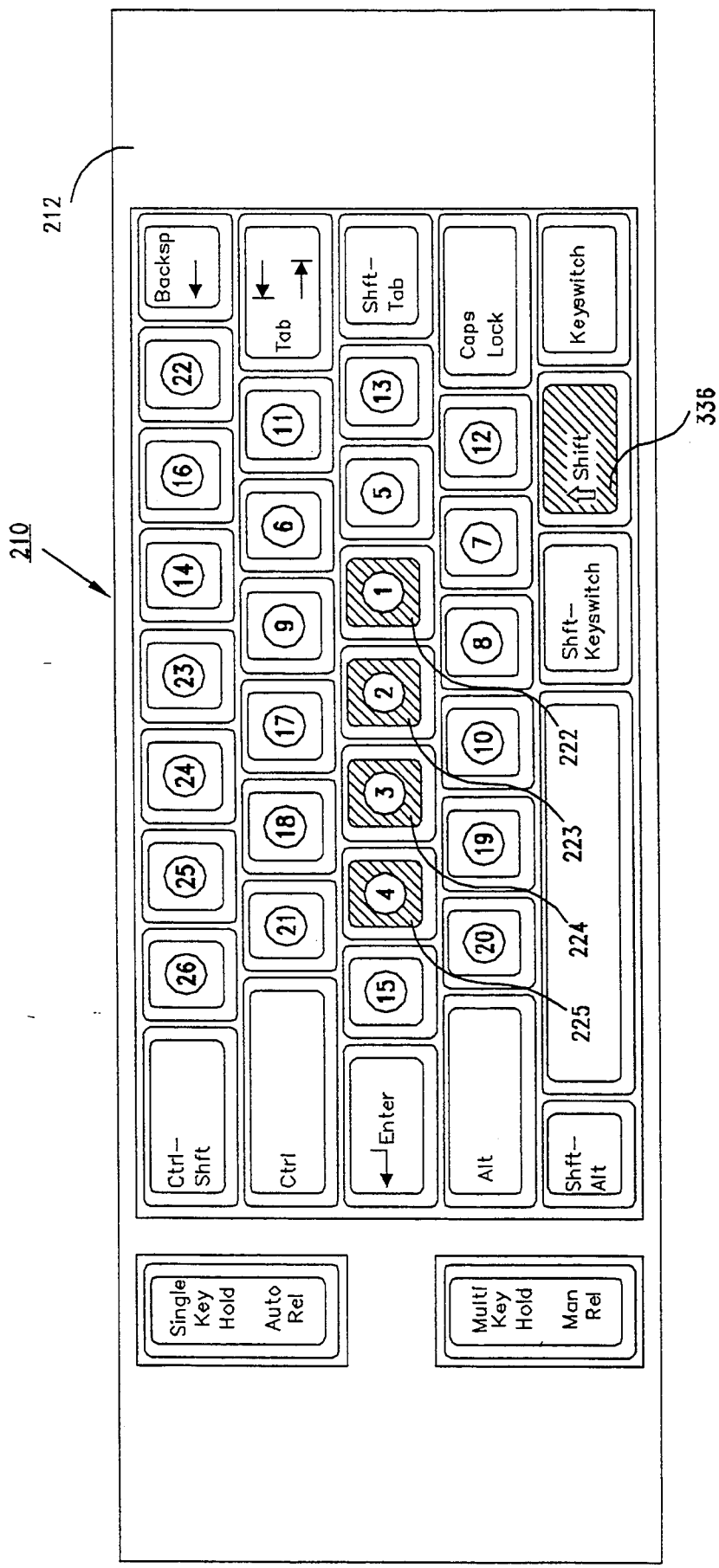

FIG. 5 is another top plan view of the left-hand keyboard like FIG. 2, using Arabic numbers 1 through 26 to indicate optimum letter key sequence, and with the "home" keys indicated by shading.

Figure 6:
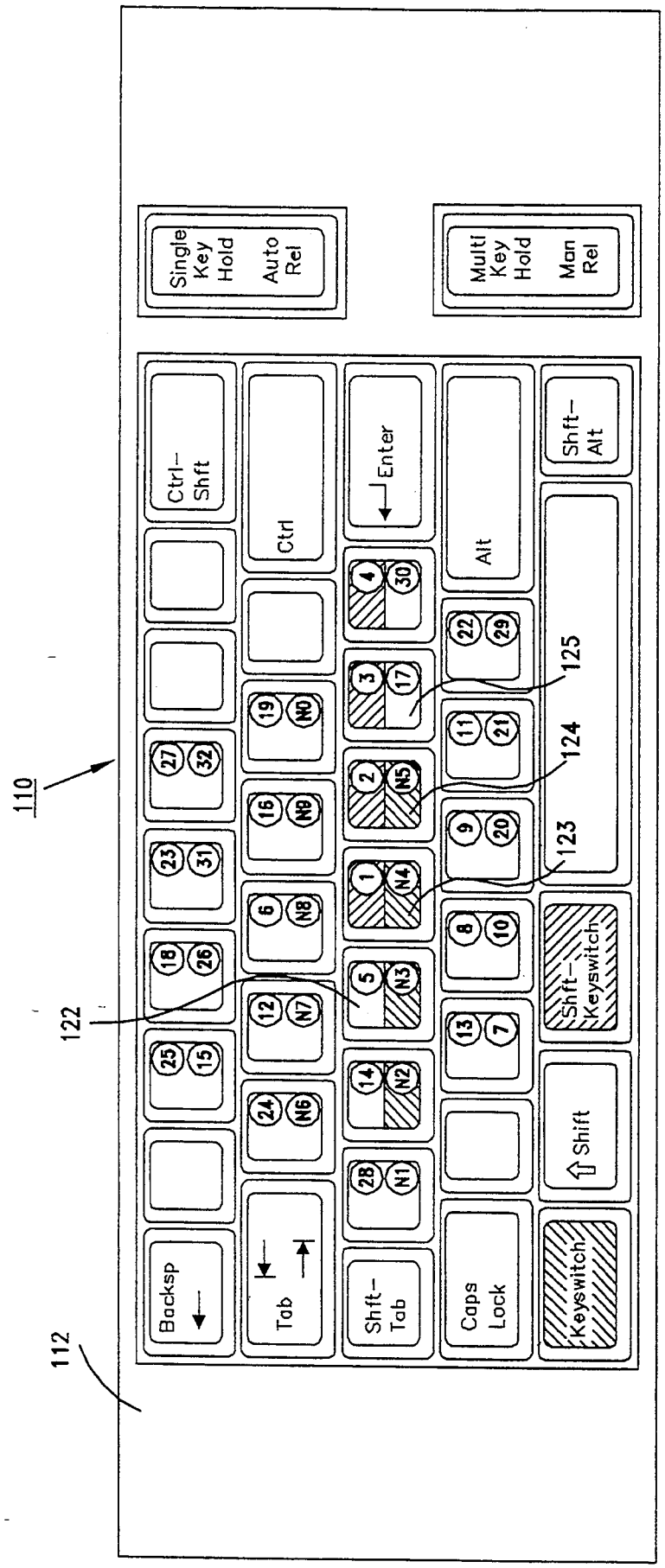

FIG. 6 is another top plan view of a right hand keyboard like that of FIGS. 1 and 4, using Arabic numerals to indicate optimum KEYSWITCH and SHFT-KEYS-WITCH character sequences, with the "home" keys indicated by shading, and with key positions for numerals 0 through 9 indicated by an "N" prefix.

Figure 7:
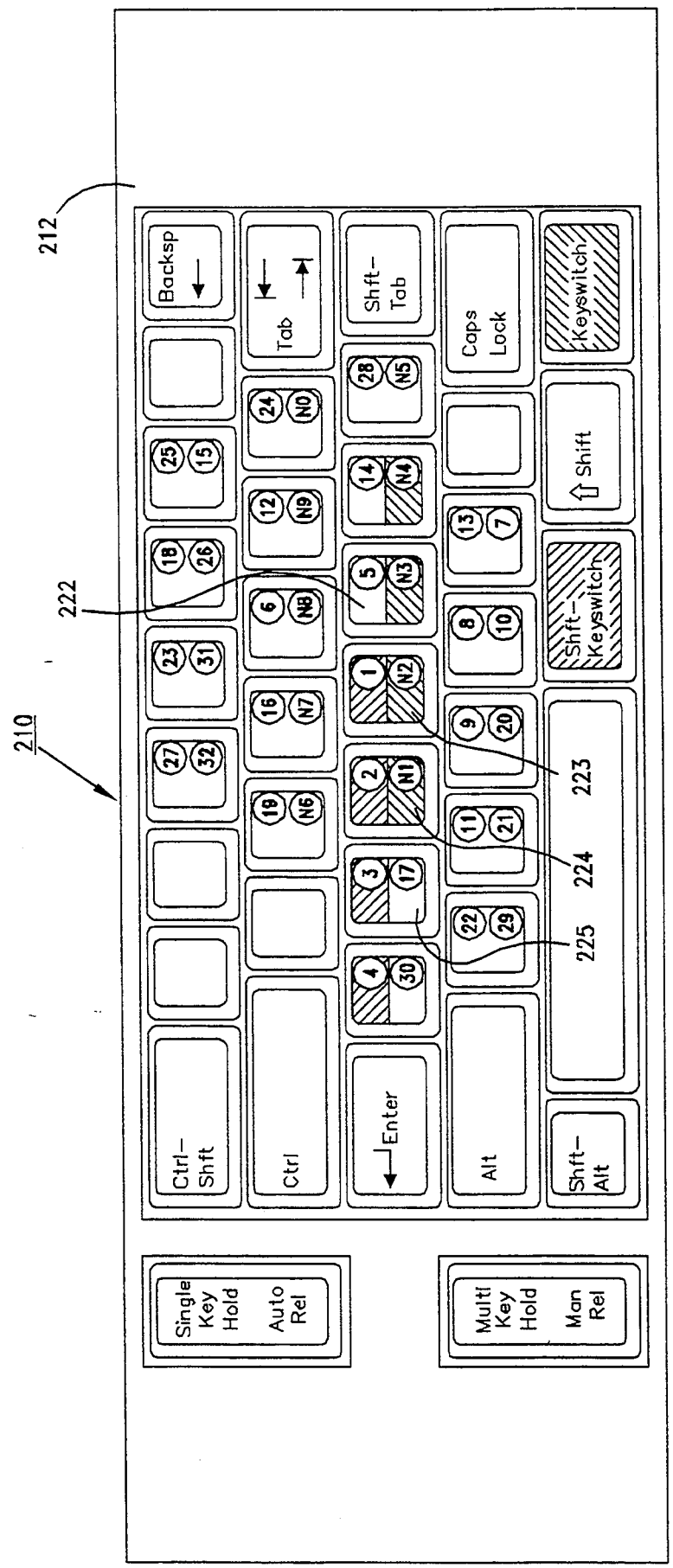

FIG. 7 is another top plan view of a left-hand keyboard like FIGS. 2 and 5, and illustrating the optimum KEYSWITCH and SHFT-KEYSWITCH sequence, with the "home" keys indicated by shading and with the key positions representing the numerals 0 through 9 including an "N" as a prefix.

Figure 8:
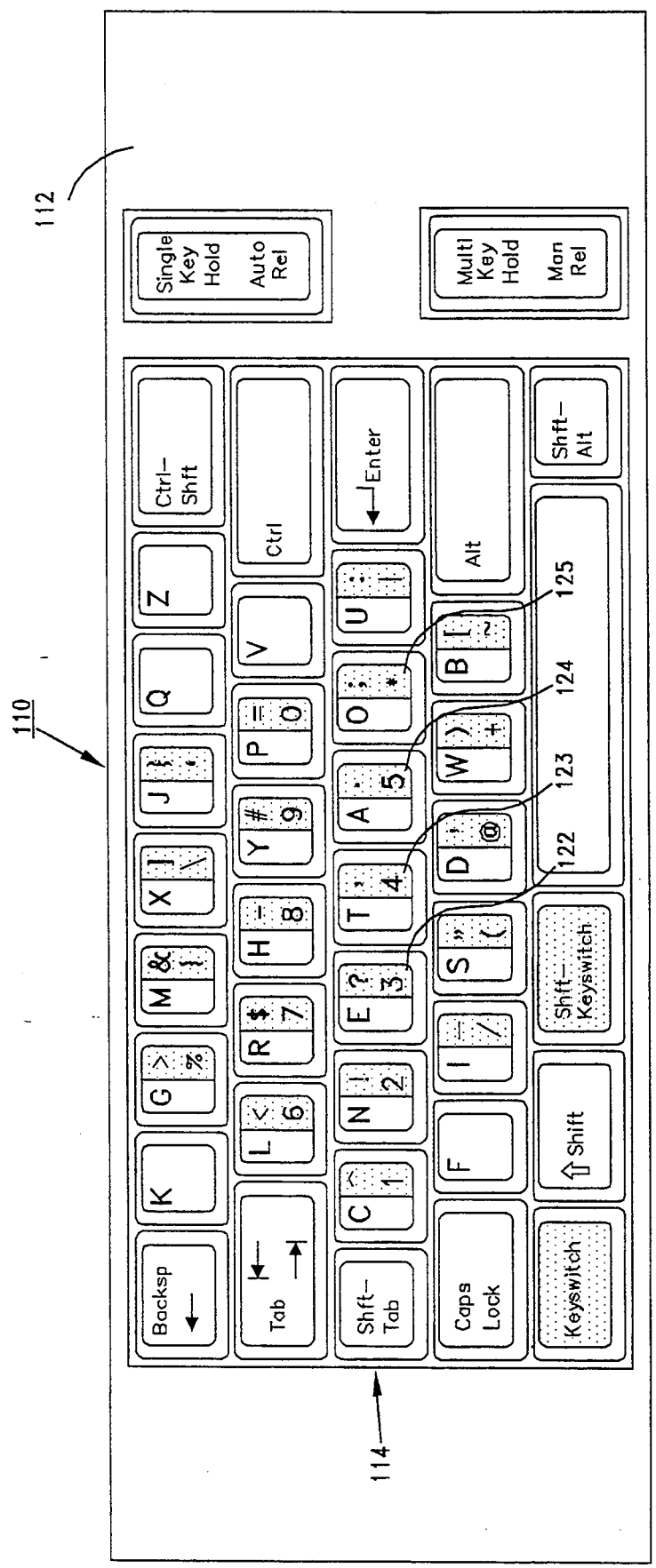

FIG. 8 is another top plan view of a right-hand keyboard layout based upon a minimum work effort sequence calculated in accordance with Table 1.

Figure 9:
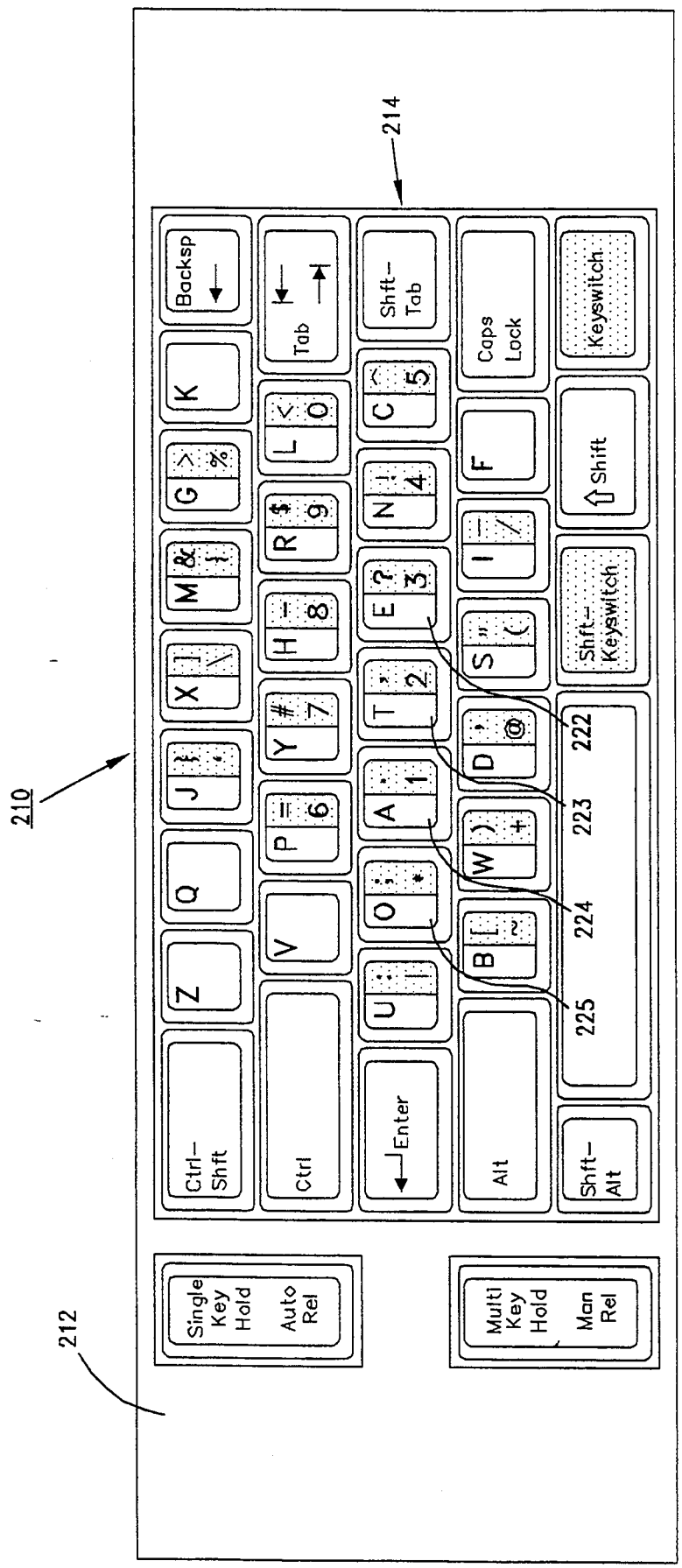

FIG. 9 is another top plan view of a left-hand keyboard layout based upon a minimum work effort sequence calculated in accordance with Table 1.

Figure 10:
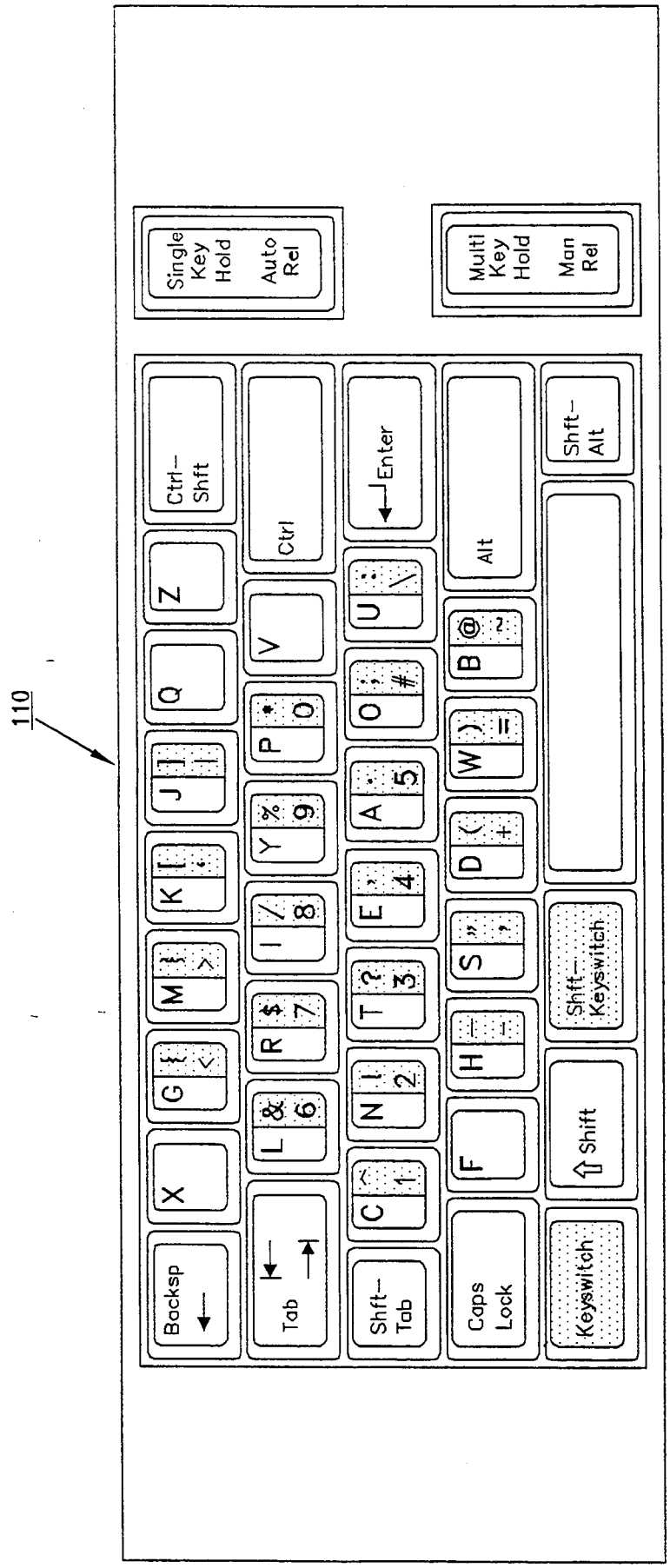

FIG. 10 is a top plan view of a final right-hand keyboard layout with selected letters reassigned to minimize consecutive same-finger strikes based on standard lists of common two-letter combinations, and in which the symbol arrangement is modified to accommodate customary paired characters.

Figure 11:
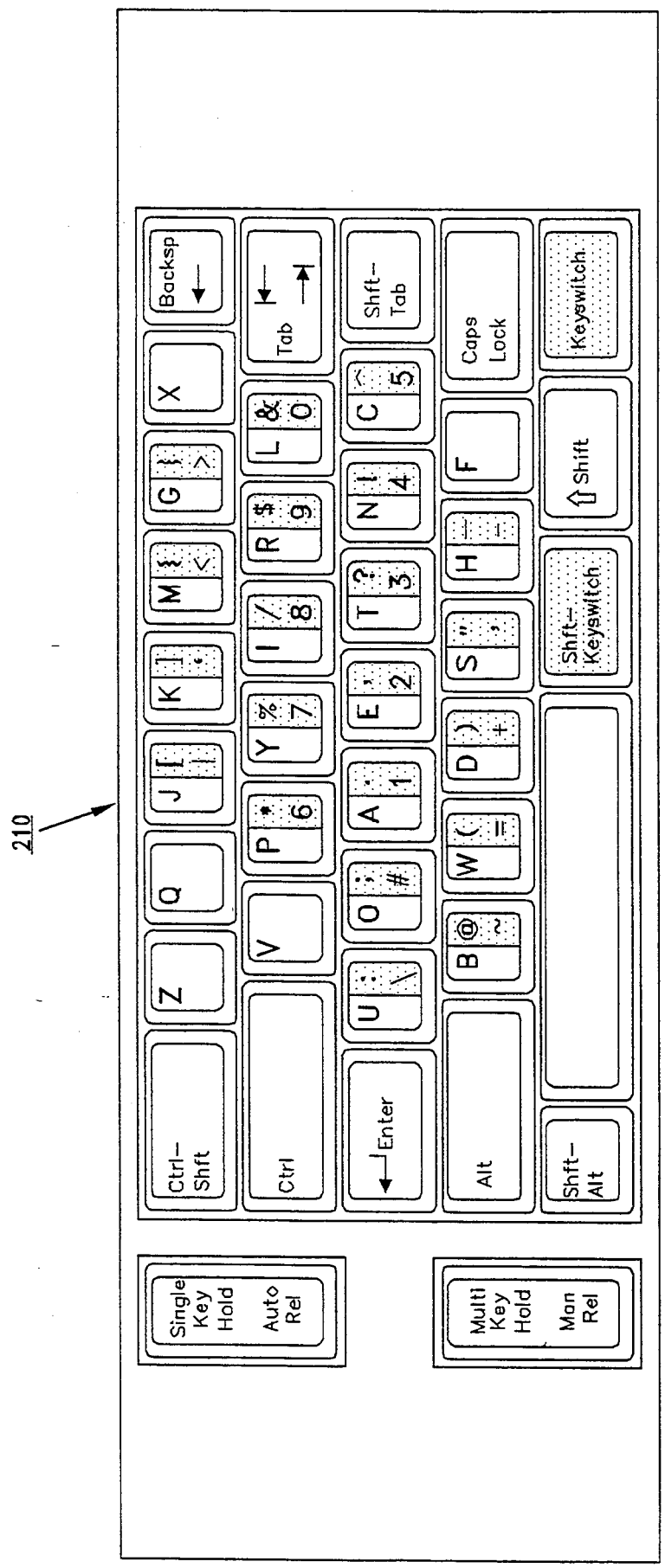

FIG. 11 is a top plan view of a final left-hand keyboard layout with selected letters reassigned to minimize consecutive same-finger strikes based on standard lists of common two-letter combinations, and in which the symbol arrangement is modified to accommodate customary paired characters.

Figure 12:
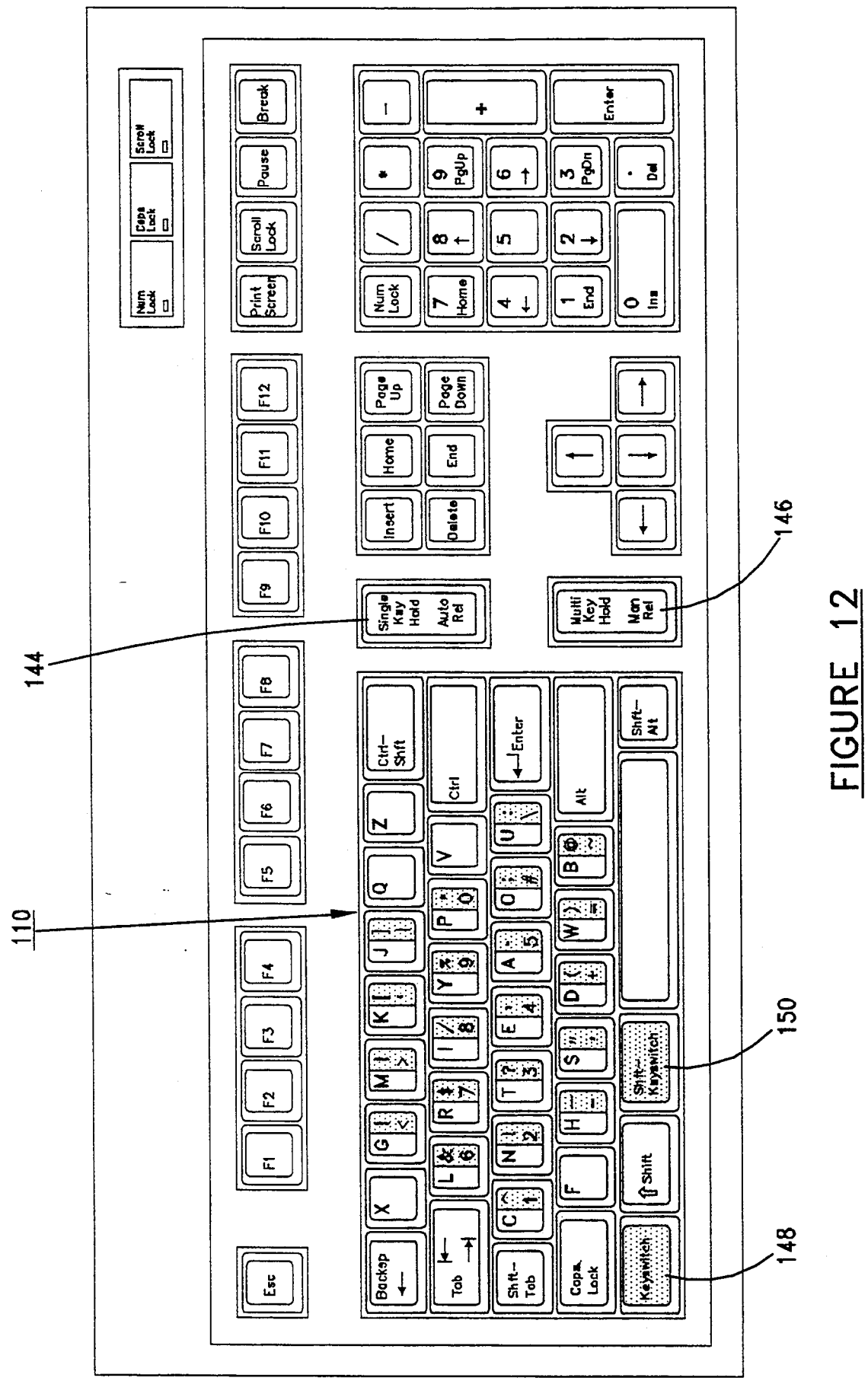

FIG. 12 is a top plan view of a full function, single handed, right-hand keyboard.

Figure 13:
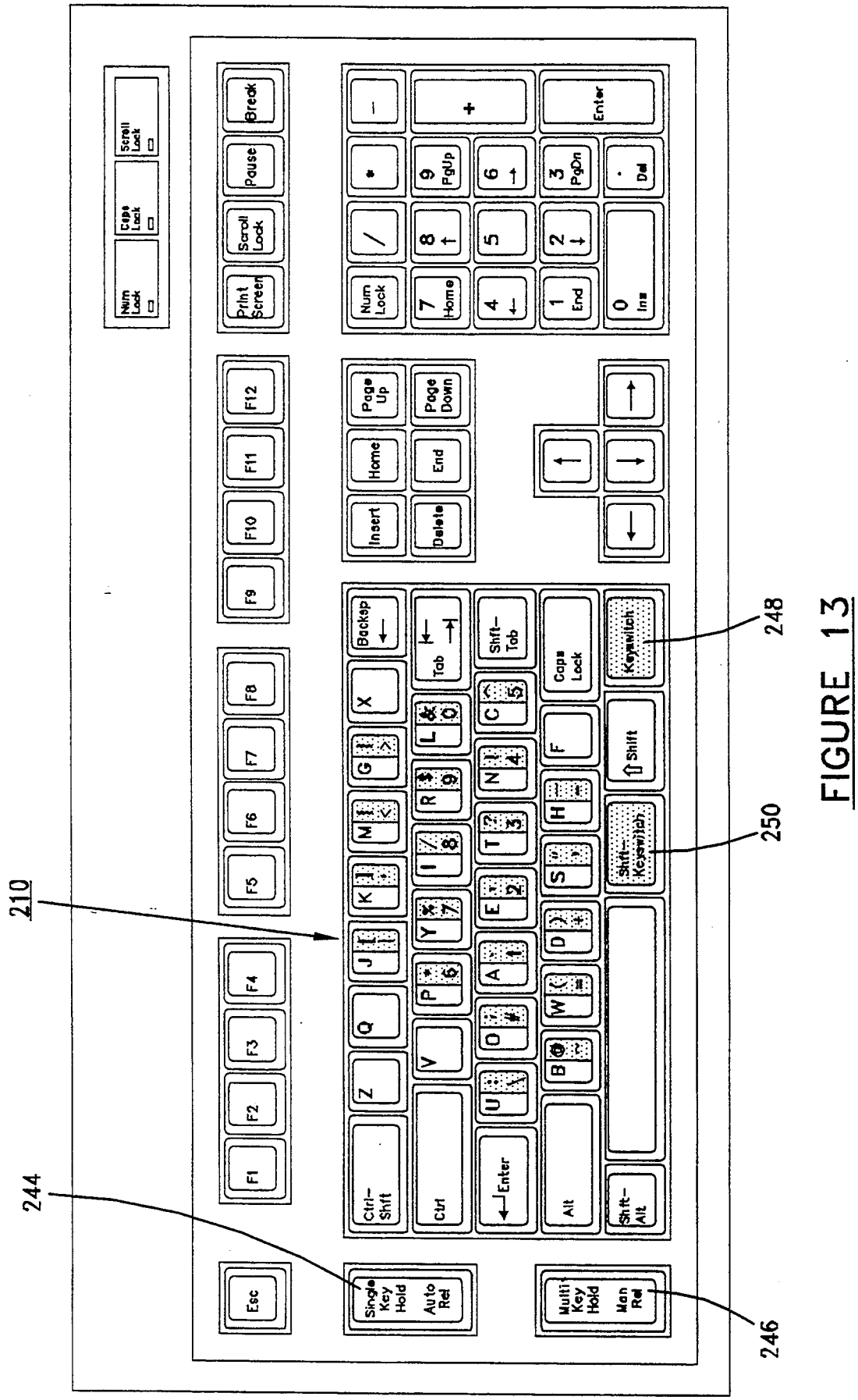

FIG. 13 is a top plan view of a full function, single handed left-hand keyboard.

Figure 14:
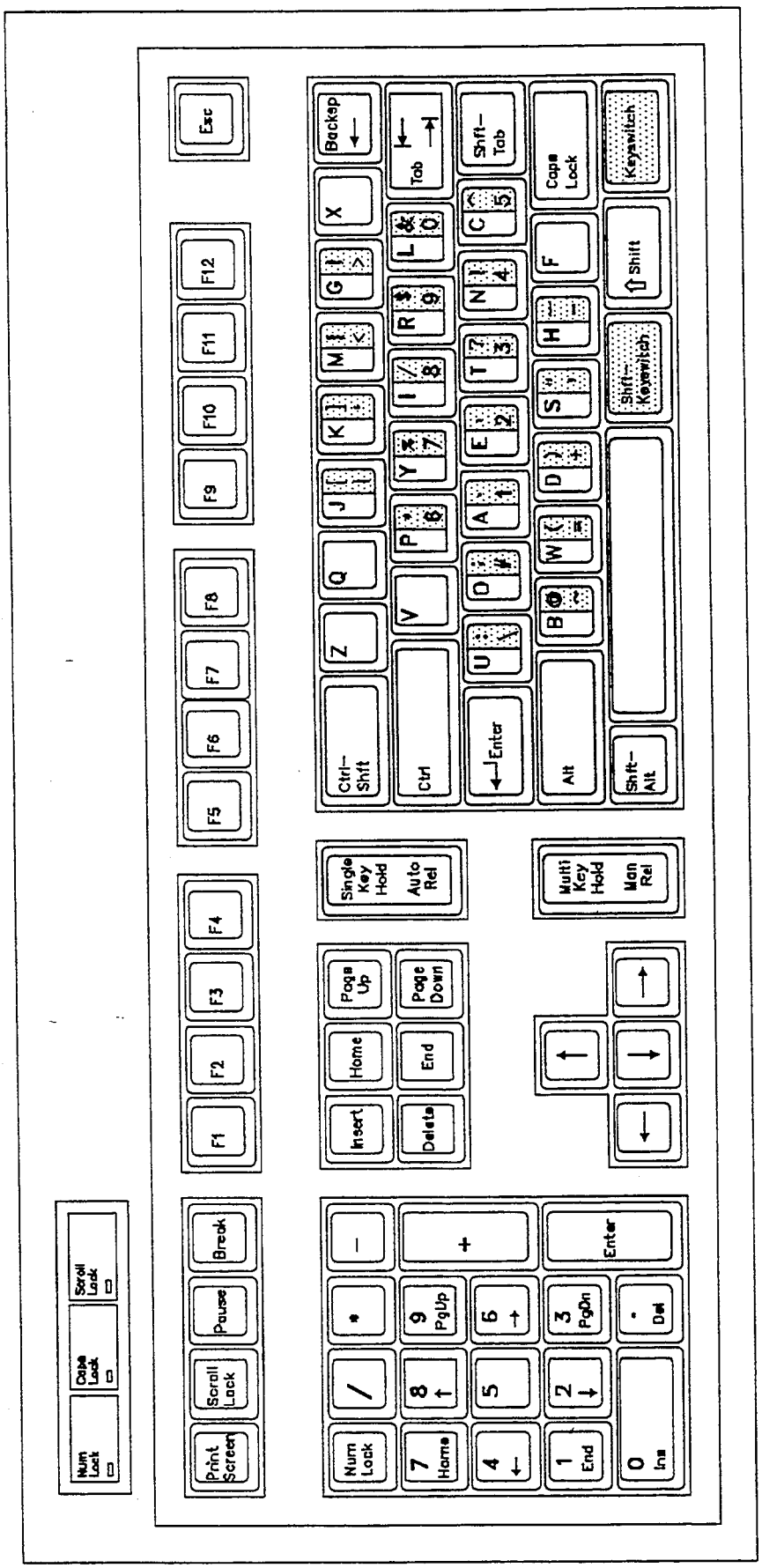

FIG. 14 is a top plan view of another embodiment of a full function, single-handed left-hand keyboard.

Figure 15:
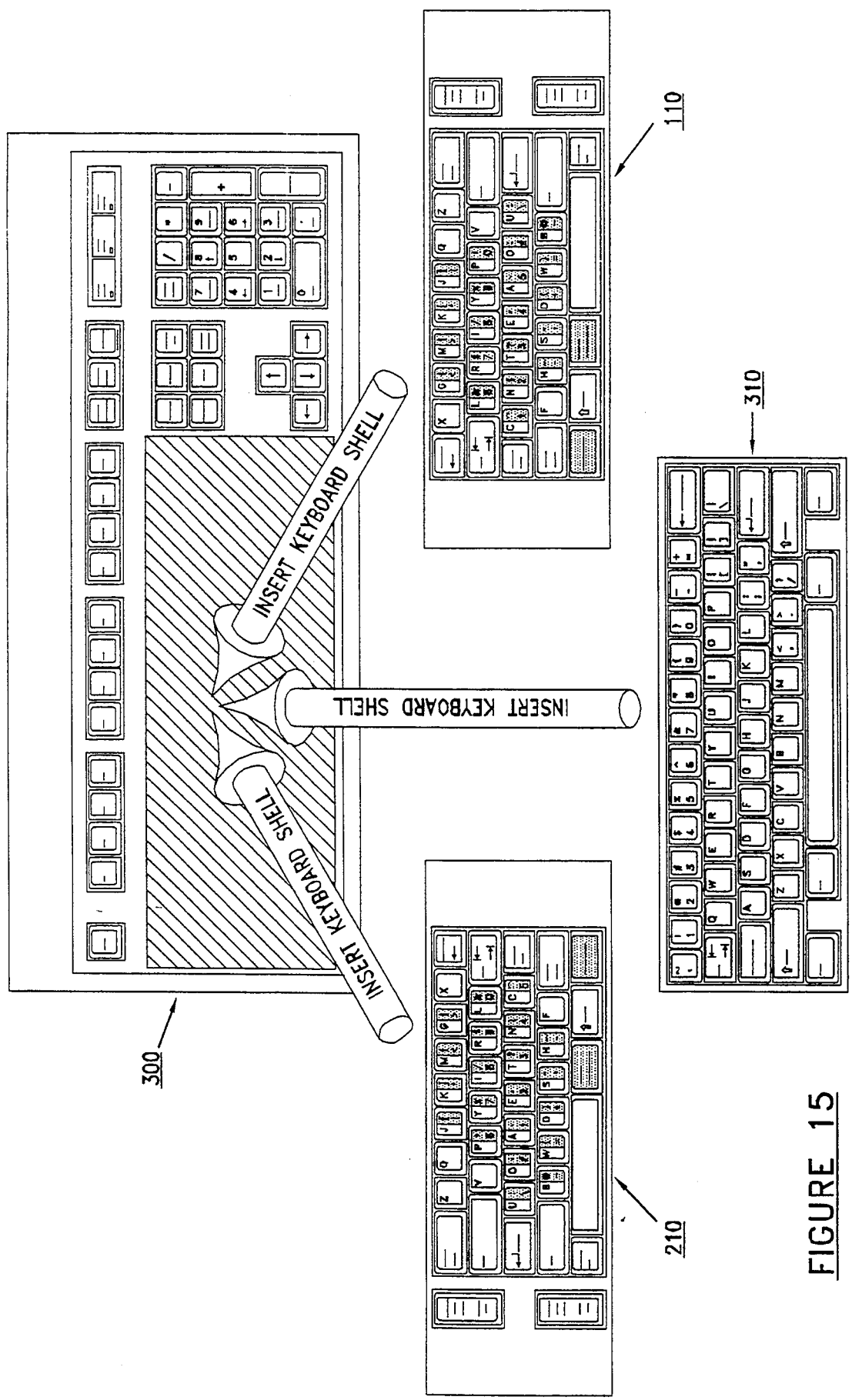

FIG. 15 is a perspective view illustrating a standard keyboard shell, and the manner in which both right-hand and left-hand keyboards of FIGS. 1 and 2, and a standard keyboard, may be fitted together with the standard shell.

Figure 16:
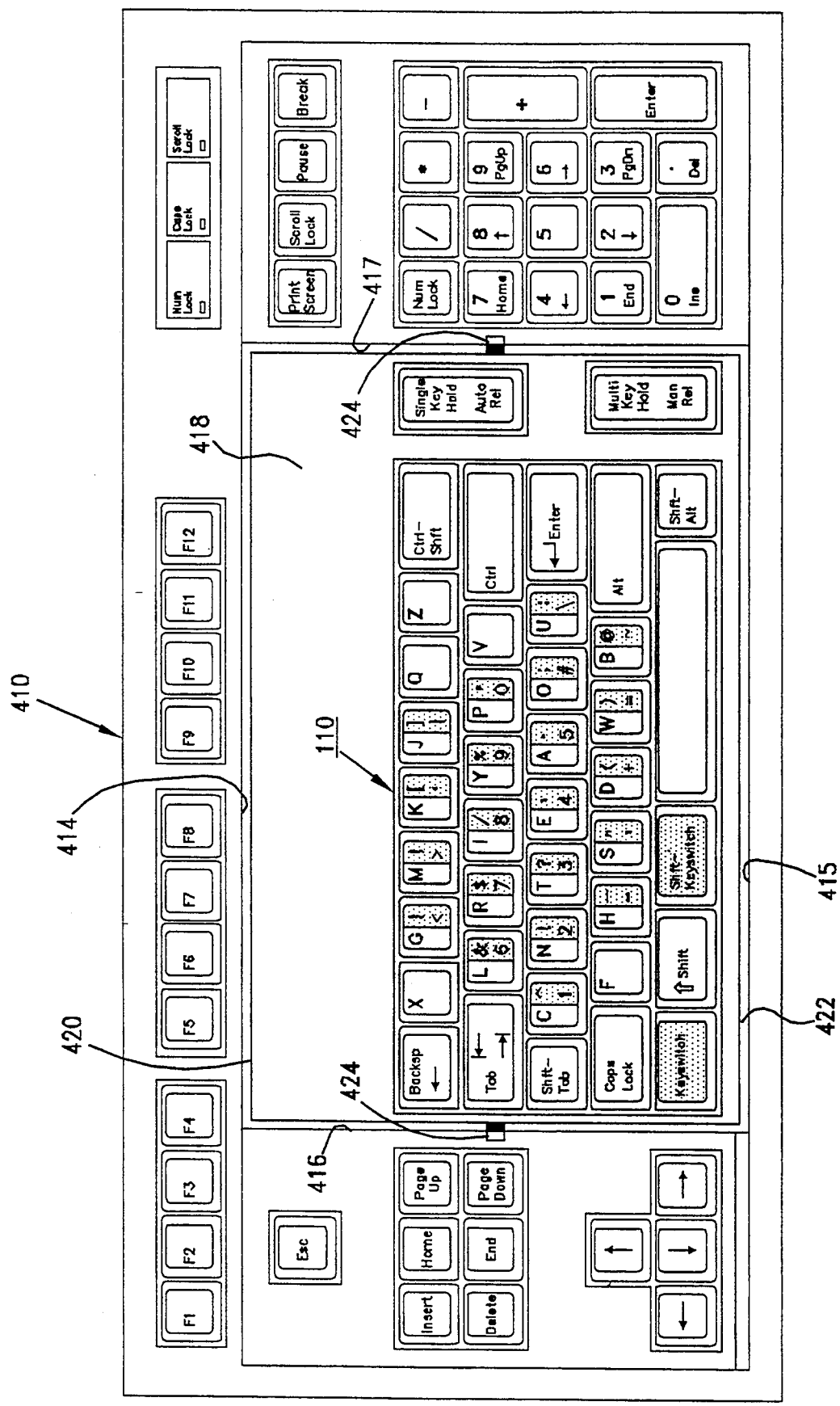

FIG. 16 is a process flow diagram for the electronic SINGLE-KEY HOLD/AUTOMATIC RELEASE function utilized with the keyboards illustrated in FIGS. 1–15.

Figure 17:
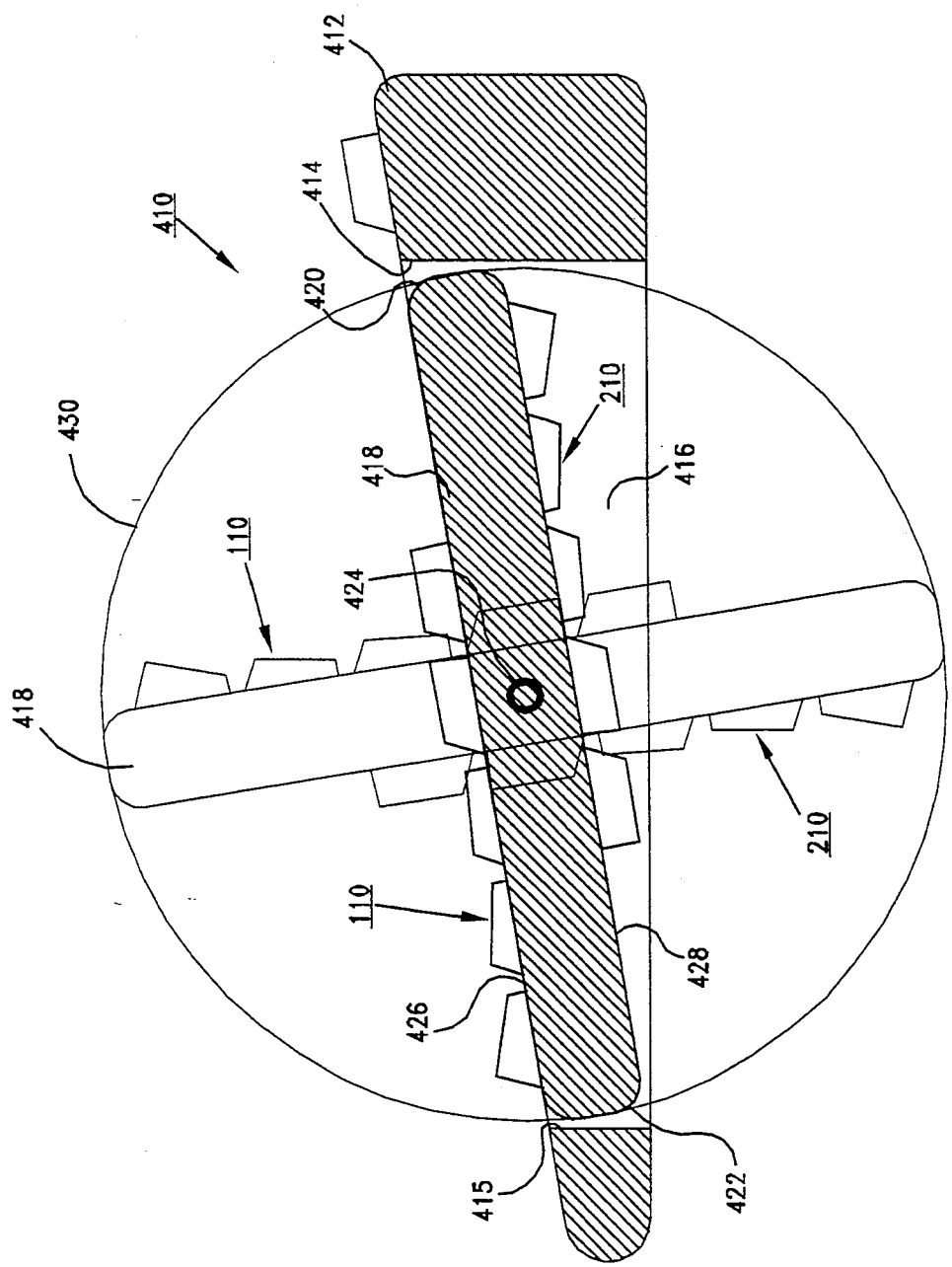

FIG. 17 is a process flow diagram for the MULTI-KEY HOLD/MANUAL RELEASE function utilized with the keyboards illustrated in FIGS. 1–15.

Figure 18:
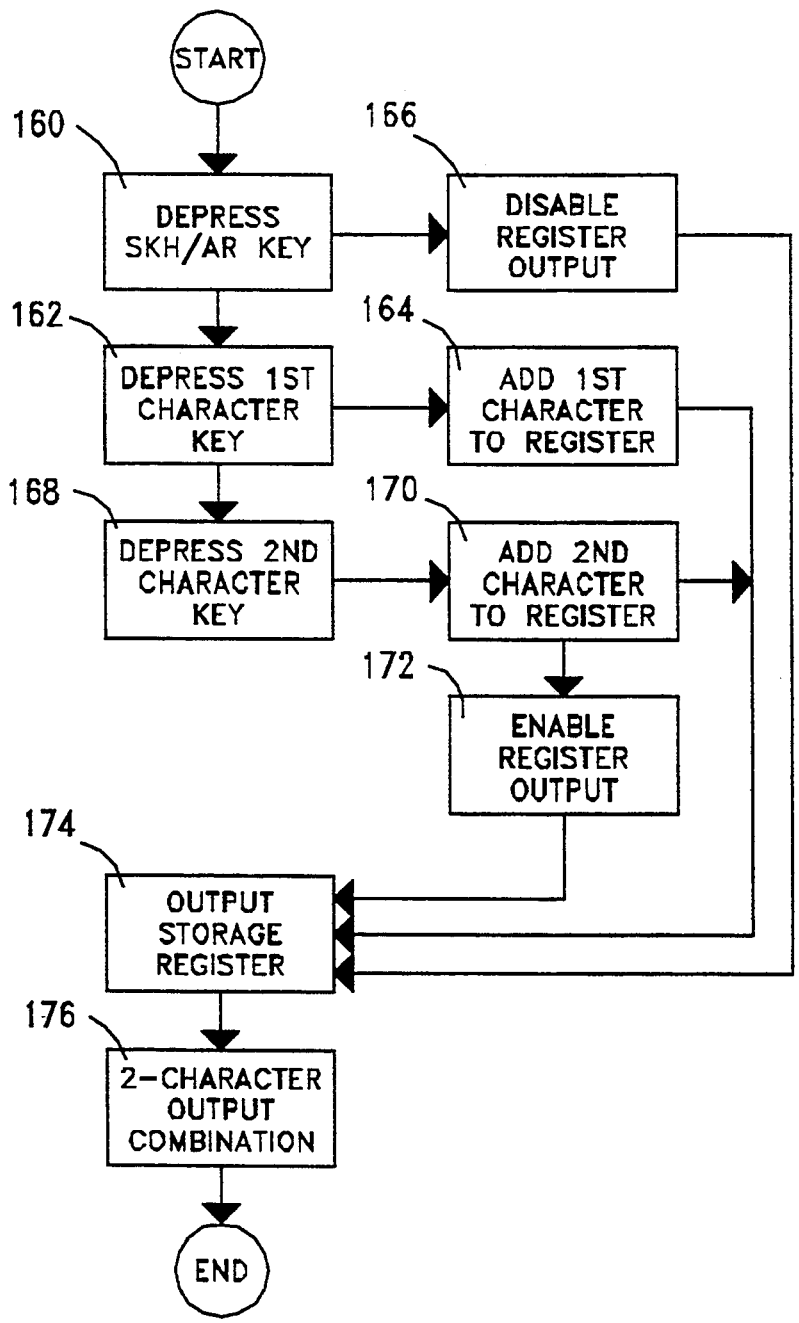

FIG. 18 is a top plan view of a keyboard system containing right- and left-hand keyboards on opposite sides of a rotatable base.

Figure 19:
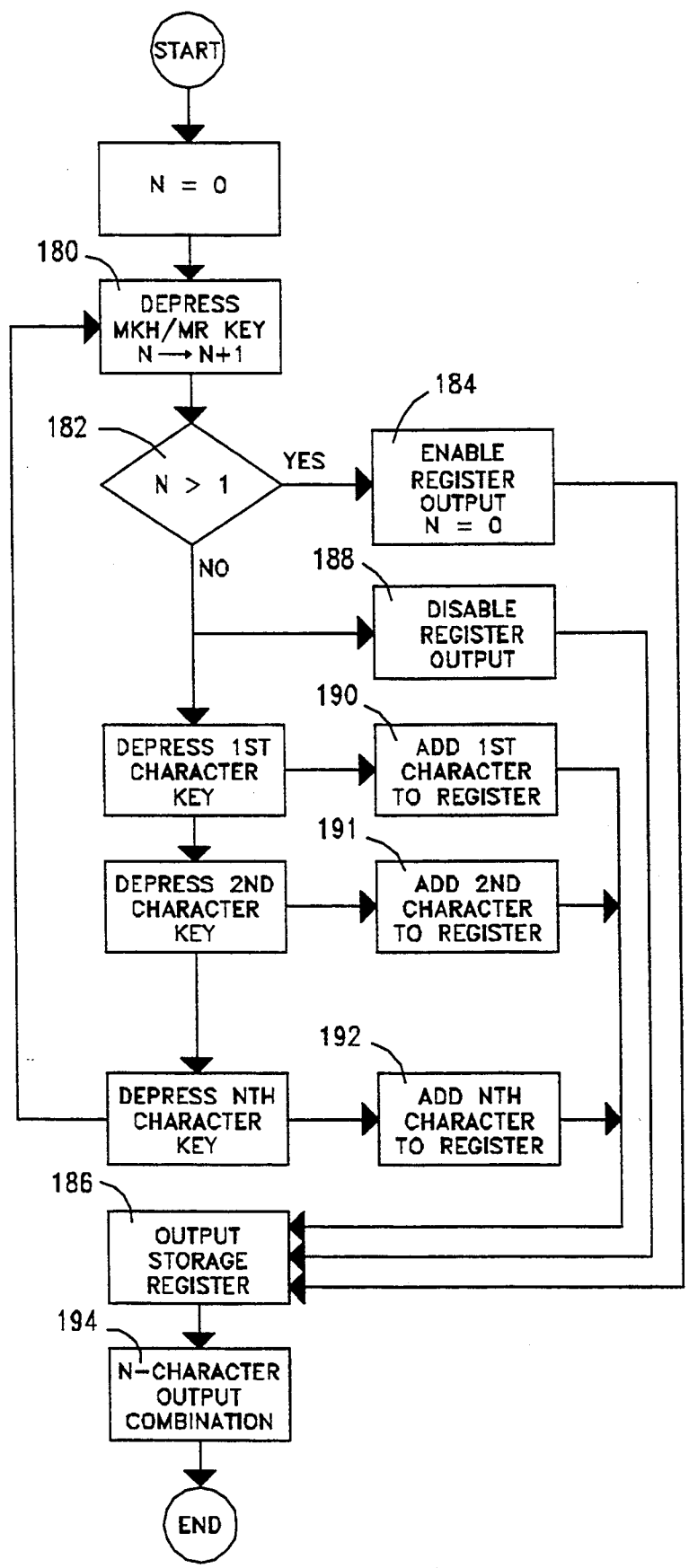

FIG. 19 is a cross-section of the keyboard shown in FIG. 18 showing rotation between the right- and left-hand keyboards.

DETAILED DESCRIPTION

1. The One-Hand Keyboard Arrangements

Referring first to FIGS. 1 and 4, there is shown an optimized data entry keyboard 110 which, according to the present invention, is completely operational by a single human hand and includes all standard alphabetic, numeric, punctuation and function keys found on a standard two hand electronic data entry keyboard.

The right-hand keyboard 110 includes a keyboard housing 112, and four rows of keys 114, 116, 118 and 120, with four of the keys 122, 123, 124 and 125 serving as the home keys in row 114. In that regard, key 122 is the home key for the right index finger; key 123 is the home key for the right middle finger; key 124 is the home key for the right ring finger; and key 125 is the home key for the right little finger. As shown in FIG. 4, the "shift" key 136 is easily operated by the right thumb. Keys 132–142 serve various conventional keyboard features which are indicated by legends on those keys (except key 137, which contains no legend and functions as a conventional "space bar").

The right-hand keyboard 110 also includes special function keys 144, 146, 148 and 150, the purpose for which will be explained in greater detail below.

It is thus seen that in the optimum right-hand keyboard 110, the home keys are formed respectively by the letters T-E-A-O. FIG. 3 is a finger stroke reference diagram, showing paths depicted by arrows indicating which fingers on the right hand are used to stroke each key, and with the encircled numerals 1 through 26 indicating arbitrary reference numbers used to identify key selection in Column 1 of Table 1. In accordance with the present invention, it will be understood that the fingers on the right hand can depress all of the alphanumeric keys in rows 114, 116, 118 and 120 by moving less than three key positions from the center, home row 114, as depicted by the arrows in FIG. 3.

There is also shown in FIGS. 2 and 5, an optimized left-hand keyboard 210 mounted in a keyboard housing 212, and defining four rows 214, 216, 218 and 220 in a manner similar to the right-hand keyboard 110 of FIG. 1. Home keys for the left-hand keyboard 210 are defined by keys 222–225. In this regard, key 222 functions as the home key for the left index finger; key 223 serves as the home key for the left middle finger; key 224 serves as the home key for the left ring finger; and key 225 serves as the home key for the left little finger. Likewise, the "shift" key 236 if easily operated by the left thumb, as indicated by FIG. 5.

In a manner similar to that shown with respect to the right-hand keyboard depicted in FIG. 3, the left-hand keyboard of FIGS. 2 and 5 likewise permits the fingers on the left hand to depress all of the alphanumeric keys in rows 214, 216, 218 and 220 by moving less than three key positions from the home keys 225 in the center home row 214.

It will be further understood by comparing FIGS. 1, 3 and 4 with FIGS. 2 and 5 that the left-hand keyboard 210 of FIG. 2 is essentially a "mirror image" of the right-hand keyboard 110 shown in FIG. 1, such that the same finger on the right hand depresses the same keys as the same finger on the left hand, with the same relative work effort being exerted by the same finger for the same key. It will further be appreciated by those skilled in the art that all keys remain within the normal span for a right or left hand as that of a standard, two-handed keyboard, which typically is about five inches from the little finger to the index finger.

The manner in which the optimal position for each key on the keyboards 110 and 210 is selected will now be described with reference to FIG. 3 and Table 1 set out below. Table 1 is used to determine the distance that the four fingers of either hand must travel from their assigned "home" position when selecting any other key, and is useful in assigning an ordered number sequence to the alphabetic keys based on the amount of work required for each finger to select a desired key.

TABLE 1

MINIMUM WORK EFFORT KEY SEQUENCE OPTIMIZATION CALCULATION TABLE

| PATH REF (1) | LATERAL DISTANCE (2) | VERTICAL DISTANCE (3) | RELATIVE FINGER EFFORT (4) | RELATIVE WORK TO SELECT KEY (5) | MINIMUM-WORK KEY SEQUENCE (6) |
|---|---|---|---|---|---|
| 1-1 | 0.000 | 0.100 | 1.00 | 0.100 | 1 |
| 1-5 | 0.839 | 0.100 | 1.00 | 0.939 | 8 |
| 1-6 | 0.839 | 0.100 | 1.00 | 0.939 | 7 |
| 1-7 | 1.352 | 0.100 | 1.00 | 1.452 | 12 |
| 1-8 | 0.750 | 0.100 | 1.00 | 0.850 | 5 |
| 1-9 | 1.500 | 0.100 | 1.00 | 1.600 | 13 |
| 1-10 | 1.250 | 0.100 | 1.00 | 1.350 | 11 |
| 1-11 | 0.791 | 0.100 | 1.00 | 0.891 | 6 |
| 1-12 | 2.035 | 0.100 | 1.00 | 2.135 | 22 |
| 1-13 | 1.625 | 0.100 | 1.00 | 1.725 | 16 |
| 1-14 | 1.505 | 0.100 | 1.00 | 1.605 | 14 |
| 2-2 | 0.000 | 0.100 | 1.33 | 0.133 | 2 |
| 2-15 | 0.839 | 0.100 | 1.33 | 1.249 | 10 |
| 2-16 | 0.791 | 0.100 | 1.33 | 1.185 | 9 |
| 2-17 | 1.505 | 0.100 | 1.33 | 2.135 | 23 |
| 3-3 | 0.000 | 0.100 | 2.00 | 0.200 | 3 |
| 3-18 | 0.839 | 0.100 | 2.00 | 1.878 | 19 |
| 3-19 | 0.791 | 0.100 | 2.00 | 1.782 | 17 |
| 3-20 | 1.505 | 0.100 | 2.00 | 3.210 | 24 |
| 4-4 | 0.000 | 0.100 | 2.00 | 0.200 | 4 |
| 4-21 | 0.839 | 0.100 | 2.00 | 1.878 | 20 |
| 4-22 | 0.750 | 0.100 | 2.00 | 1.700 | 15 |
| 4-23 | 0.791 | 0.100 | 2.00 | 1.782 | 18 |
| 4-24 | 0.901 | 0.100 | 2.00 | 2.002 | 21 |
| 4-25 | 1.505 | 0.100 | 2.00 | 3.210 | 25 |
| 4-26 | 0.737 | 0.100 | 2.00 | 3.674 | 26 |
| TOTAL RELATIVE WORK - ALL KEYS (7): | | | | 39.804 | |

In Table 1, Column 1 is designated "Path Ref" and refers to the finger stroke paths depicted in FIG. 3 for finger movements relative to the home keys 122–125 for keyboard 110 and keys 222–225 for keyboard 210 (see FIG. 3). Column 2 of Table 1 refers to the "Lateral Distance" and indicates the distance travelled horizontally between each "home" key 122–125 or 222–225 and another selected key for each finger movement. Column 3 of Table 1 is the "Vertical Distance", and indicates the vertical movement component of the key when depressed. Column 4 of Table 1 indicates the "Relative Strength", indicating the results of tests which were conducted to obtain the relative strength on each of the four fingers needed to depress a key. Those measured results for typical individuals are:

| Finger | Relative Strength |
|---|---|
| Index | 1.00 |
| Middle | 0.75 |
| Ring | 0.50 |
| Little | 0.50 |

Continuing, Column 5 of Table 1 indicates the "Relative Work to Select Key" and is the product of the relative finger effort of Column 4 times the sum of the vertical and lateral distances tabulated in Columns 2 and 3, respectively. Column 6 indicates the "Minimum Work Key Sequence" as an ordered arrangement of each key in terms of the relative work to select each key. The higher the sequence number, the higher the work effort required to select that key. Finally, the bottom entry as number 7 in Table 1 indicates the "Total Relative Work" which is the sum of the work effort for all of the keys, and indicates a measure of keyboard work efficiency which can be used to select optimum home key locations and key-to-finger assignments. By way of example, shifting the four finger home keys one key to the left results in a total relative work of 40.108, which is higher than the total relative work of 39.804 given in Table 1.

It will therefore be understood that, using the analysis set out in FIG. 3 and Table 1, the optimum numbering sequence for the right-hand keyboard is shown in FIG. 4 and the left-hand keyboard in FIG. 5. The data in Column 6 of Table 1 is then used to assign alphabet letters to keys based on the frequency of occurrence of each letter in the English language.

Referring now to Table 2 set out on page 16, there is shown the relative frequency of occurrence for letters in the English language. Using this data, the letters of the alphabet are arranged on the keys by assigning the highest frequency letters to the lowest work effort keys as determined in Table 1. Thus, the letter "E" is assigned to key 123, the letter "T" is assigned to key 122, the letter "A" is assigned to key 124 and the letter "O" is assigned to key 125. This arrangement continues in descending order of frequency, with the key for the letter "Z" appearing in the location indicated by the encircled numeral 26 in FIG. 3.

Of course, there remains the task of assigning numerals and grammatic symbols to the keys as well. As indicated for the right-hand keyboard 110 in FIG. 6 and the left-hand keyboard 210 in FIG. 7, Arabic numerals are assigned to keys by the indicated number with the prefix "N". The 32 grammatic symbols are assigned to keys utilizing Table 3.

TABLE 2

| LETTER | DESCENDING ORDER OF FREQUENCY |
|---|---|
| e | 1 |
| t | 2 |
| a | 3 |
| o | 4 |
| n | 5 |
| r | 6 |
| i | 7 |
| s | 8 |
| h | 9 |
| d | 10 |
| l | 11 |
| f | 12 |
| c | 13 |
| m | 14 |
| u | 15 |
| g | 16 |
| y | 17 |
| p | 18 |
| w | 19 |
| b | 20 |
| v | 21 |
| k | 22 |
| x | 23 |
| j | 24 |
| q | 25 |
| z | 26 |

TABLE 3

RELATIVE FREQUENCY OF SYMBOLS[1]

| SYMBOL | DESCENDING ORDER OF FREQUENCY | SYMBOL | DESCENDING ORDER OF FREQUENCY |
|---|---|---|---|
| , | 1 | * | 17 |
| . | 2 | & | 18 |
| ; | 3 | = | 19 |
| : | 4 | @ | 20 |
| ? | 5 | + | 21 |
| - | 6 | [ | 22 |
| / | 7 | ] | 23 |
| " | 8 | < | 24 |
| ' | 9 | > | 25 |
| ( | 10 | { | 26 |
| ) | 11 | } | 27 |
| $ | 12 | ^ | 28 |
| — | 13 | ~ | 29 |
| ! | 14 | : | 30 |
| % | 15 | \ | 31 |
| # | 16 | ` | 32 |

[1] Frequency order based on inventor's survey and on layout of typical keyboards for personal computers.

Referring again to FIGS. 6 and 7 with reference to Table 3, it is seen that the various entries of Table 3 are reflected by encircled reference numerals indicated in each of FIGS. 6 and 7. By way of example, the "," symbol has the highest order of frequency, and is therefore assigned to key 123; the "." symbol has the second highest order of frequency, and is assigned to key 124; the ";" symbol has the third highest order of frequency, and is assigned to key 125; and so forth, as reflected in Table 3 and depicted in FIGS. 6 and 7. The keyboards 110 and 210 resulting from the analysis of FIGS. 3 and 6 (right-hand keyboard) and FIG. 7 (left-hand keyboard) together with Tables 1, 2 and 3 are depicted in FIGS. 8 and 9, respectively, and represent one optimal arrangement for the alphabetic, numeric and symbol keys for a one-hand keyboard. However, there are other features associated with the keyboards 110 and 210 which may justify a further optimization of the keyboard arrangement, and which will be discussed in greater detail below.

2. Special Function KEYSWITCH and SHFT-KEYSWITCH Keys

Referring again to FIGS. 1 and 2, two special keys labelled KEYSWITCH and SHFT-KEYSWITCH, respectively, are provided for each of the keyboards 110 and 210. For the right-hand keyboard 110 of FIG. 1, the KEYSWITCH is designated by reference numeral 148, and the SHFT-KEYSWITCH is designated by reference numeral 150; the similar keys on the left-hand keyboard 210 of FIG. 2 are designated by reference numerals 248 and 250, respectively. These keys are provided to enable the use of a single key to generate numeric or symbol characters in addition to the alphabetic characters assigned to a selected key. This multi-use capability is accomplished in the present invention by the addition of these keys 148, 150 and 248, 250 in a manner similar to the standard shift key of a conventional QWERTY keyboard, but are in addition to the standard shift key and are located in a position easily accessible by the thumb of each corresponding hand. By using the thumb to depress these keys in conjunction with other keys, multiple-character use of a selected key can be obtained.

3. Special Function SINGLE KEY HOLD and MULTI-KEY HOLD Keys

In addition to the multi-character key functions of keys 148, 150 and 248, 250 described in Section 2 above, the one-handed keyboards of the present invention are provided with additional enhancements to further facilitate efficient one-handed operation. These features are added to accommodate the simultaneous character input combinations required by some computer word processing and applications software.

Referring now to FIGS. 1 and 2, the present invention contemplates three types of key combination inputs:

a) Dual-function (e.g., SHFT-TAB) key 134 and dual prefix (e.g., CTRL-SHFT, SHFT-ALT) keys 142, 138 within the main shell 112 which generate the indicated two-key sequence with a single keystroke.

b) Special single character hold-down key 144 (labeled SINGLE KEY HOLD/AUTO REL in FIG. 1)—depressing this key, followed by any other two-key sequence, results in the simultaneous transmittal of the selected two-key combination at the moment the second character key is depressed.

c) Special multiple character hold-down key (labeled MULTI KEY HOLD/MAN REL in FIG. 1) with manual release of any selected multiple-key combination when this special hold-down key is depressed a second time.

Thus, in accordance with the present invention, keys 144 and 146 facilitate the efficient one-hand operation of the keyboard 110 (and likewise keyboard 210 of FIG. 2) by accommodating multiple-character input combinations as required by some computer application software. The single character hold down key 144 provides automatic release of any selected two-key combination when the second of the two-key combination keys is depressed. The single-key 146 provides manual release of any selected multi-key combination when this special hold down key is depressed a second time.

Referring now to FIG. 12, it is clear that these special function keys 144, 146, 148 and 150 of keyboard 110 (and the corresponding keys for left-handed keyboard 210) are particularly useful when the basic one-hand keyboard 110 or 210 is included as the alphanumeric portion of a typical "101 key" keyboard, as is used with computers today. For example, it would heretofore be extremely awkward or impossible to generate the sequence "CTRL-SHFT-F12" with one hand on a standard keyboard, because of the physical separation of those keys. In the present invention, this sequence is easily accomplished with the three-stroke sequence "SINGLE KEY HOLD/AUTO REL . . . CTRL-SHFT . . . F12" (the left-hand keyboard is similarly depicted in FIG. 13).

Referring now to FIG. 16, there is shown one example of a flow chart executed by logic circuitry within the keyboard to provide the single-key hold/manual release function of key 146. In algorithm module step 160, the keyboard senses whether or not the single-key hold/manual release key 146 (or the corresponding key 246) has been depressed. If depressed, the keyboard disables the register output as shown by step 16b, and waits for another key to be depressed, as represented by step 162.

As an output from step 164, the keyboard 110 stores the character corresponding to the alphabet key that was depressed as step 162, and the keyboard waits for a second alphabet character key to be depressed, as represented by step 168, after which that character is also added to the register storage as indicated by step 170. Simultaneously, the step 170 enables the register output as indicated by step 172, enabling an output from the storage register 174 as a two character output combination, represented by step 176.

FIG. 17 is a flow chart depicting the electronic sequence for use with multi-key 146 for keyboard 110, and multi-key 246 for keyboard 210. Prior to depressing the multi-key 146, counter N is at its normal "0" state. The sequence is initiated by depression of one of the multi-keys, as indicated by step 180 and counter N is simultaneously incremented by 1. If counter is less than or equal to 1, then the register output is disabled as the keyboard waits for the next series of character keys to be depressed. Thereafter, each character depressed is indicated by an output to the storage register 186, including outputs 190, 191 and 192. Following depression of the last desired character keys, the multi-key 146 is depressed a second time and counter N is incremented by 1. Decision module 182 now detects that counter N is greater than 1 and subsequently the output register is enabled and the counter N is reset to "0" as indicated in step 184. This permits an output from storage register 186 as indicated by the combination output 194.

4. Final Preferred Arrangement of Keyboards 110, 210

A final preferred arrangement of the keys for keyboard 110 and 210 will be described with reference to FIGS. 10 and 11, and which additional consideration is given to the arrangement of the keys to minimize the probability of successive finger strikes by the same finger, based on standard lists of common two-letter combinations. Additionally, customary paired symbol groups have been located adjacent to each other on the final preferred arrangement of keys shown in FIGS. 10 and 11. In each case, the choice of key location involves the evaluation of finger movement work effort and selections made to minimize total work effort and to minimize consecutive finger strikes by the same finger for the final keyboard arrangement. It will of course be understood by comparison of FIGS. 10 and 11 that the same keyboard layout is illustrated in FIGS. 1 and 2.

Referring now to FIG. 15, it will be appreciated by those skilled in the art that the right-hand keyboard 110 and the left-hand keyboard 210 may be easily interchanged in a modular manner with a conventional QWERTY two-handed keyboard 310, for insertion with a keyboard shell 300, and may be adapted for conventional interconnection schemes found in such keyboard shells.

5. Rotatable Keyboard System for Right-Hand and Left-Hand Keyboards

Another feature of the present invention will now be described with reference to FIGS. 18 and 19, which illustrate a rotatable keyboard system which permits easy selection of a one-hand keyboard for use with either the right or left hand. The keyboard system 410 includes a shell 412 having a central opening defined by inner surfaces 414, 415, 416 and 417, which are disposed in a generally rectangular configuration. A keyboard support 418 is mounted in the opening defined by the surfaces 414–417 via a pivot 424 at each side of the keyboard support. The keyboard support 418 has opposing first and second surfaces 426 and 428. A right-hand keyboard 110 in accordance with the discussion set out above and as illustrated in FIG. 1 is disposed in the first surface 426, and a left-hand keyboard 210 is disposed in the second surface 428. As shown in FIG. 19, the keyboard support 418 is easily rotated through an arc 430 to permit the selection of either a right-hand keyboard 110 or a left-hand keyboard 210. While a one-hand keyboard (for either the right or left hand) has particular utility for disabled persons with only one hand, ready access to either a right- or left-hand keyboard in accordance with the arrangement shown in FIGS. 18 and 19 will permit a person having a capacity to use both hands the opportunity to avoid the fatigue and stresses which often lead to permanent injuries, for example the well-known Carpal-Tunnel Syndrome.

SUMMARY

It will thus be understood from the above description that the one-handed keyboard arrangements provide the following features:

a) Individual, manually operable keys, 5 rows of standard keys, character keys having nominal 0.75" center spacing in both horizontal and vertical directions, alternating 6 and 7 keys in juxtaposed rows from the bottom to top.

b) The maximum distance of the center of any alphabetic key from the center of any home key being less than about two inches.

c) Twenty-six alphabet keys which also include ten numbers and thirty-two symbols which are utilized in conjunction with the special KEYSWITCH and SHFT-KEYSWITCH control keys.

d) Special SINGLE KEY HOLD/AUTO RELEASE and MULTI-KEY HOLD/MANUAL RELEASE function keys and a process for their use in generating multiple character combinations with one hand.

e) Two keyboard layouts which include all functions of the standard "101 KEY" keyboards now commonly in use, but which incorporate the left and right one-hand shell, respectively, of the present invention in place of the standard two-hand alphanumeric/symbol shell of the standard "101 KEY" keyboard.

f) A modular keyboard layout which allows choice of left-hand, right-hand, or standard shells which are insertable into the otherwise standard "101 KEY" keyboard arrangement.

g) The processes described for using the above keyboard layouts to make possible one-hand input of typical documents and data with speed and efficiency equal to that of a two-handed person using a conventional keyboard such as might be found with computer systems today.

h) A rotatable keyboard system permitting easy selection of either a right-hand or left-hand keyboard.

This concludes the description of the preferred embodiments. A reading by those skilled in the art will bring to mind various changes without departing from the spirit and scope of the invention. It is intended, however, that the invention only be limited by the following appended claims.

What is claimed is:

1. A manually activated keyboard for use with one hand, comprising:

a plurality of individual alphanumeric keys on the keyboard, each alphanumeric key operable for a different letter of the alphabet when depressed; wherein the keys are positioned side-by-side on the keyboard in five linear rows, that closest to the vertical center being the central row, the central row including four consecutive home keys for the four fingers of a selected hand;

a home key for the index finger;

a home key for the middle finger;

a home key for the ring finger; and a home key for the little finger;

the home keys representing the letters "T," "E," "A," and "O" of the English alphabet; and wherein the letter "T" is on the home key for the index finger for the selected hand, the letter "E" is on the home key for the middle finger of the selected hand, and letter "A" is on the home key for the ring finger of the selected hand, and the letter "O" is on the home key for the little finger of the selected hand.

2. A manually activated keyboard for use with one hand, comprising:

a plurality of individual alphanumeric keys on the keyboard, each alphanumeric key operable for a different letter of the alphabet when depressed; wherein the keys are positioned side-by-side on the keyboard in five linear rows, that closest to the vertical center being the central row, the central row including four consecutive home keys for the four fingers of a selected hand;

a home key for the index finger;

a home key for the middle finger;

a home key for the ring finger; and a home key for the little finger;

the home keys representing the letters "T," "E," "A," and "O" of the English alphabet; and wherein the letter "T" is on the home key for the index finger for the selected hand, the letter "E" is on the home key for the middle finger of the selected hand, and letter "A" is on the home key for the ring finger of the selected hand, and the letter "O" is on the home key for the little finger of the selected hand; and further including three additional keys on the central home row, two of the keys adjacent to the index finger home key and a third key adjacent to the little finger home key.

3. The keyboard recited in claim 2 wherein the two keys adjacent to the index finger home key represent the letters "N" and "C", respectively, and the key adjacent to the little finger home key represents the letter "U".

4. A manually activated keyboard for use with one hand, comprising:
- a plurality of individual alphanumeric keys on the keyboard, each alphanumeric key operable for a different letter of the alphabet when depressed; wherein
- the keys are positioned side-by-side on the keyboard in not more than four rows, that closest to the vertical center being the central row, and that uppermost on the keyboard being the uppermost row, the alphanumeric keys of the uppermost row being juxtaposed relative to the central row so that each key in the uppermost row is located at most two key positions from a key in the central row; wherein
- the keys in the central row include four consecutive home keys for the four fingers of a selected hand; wherein
- keys in the uppermost row within three key positions from the index finger home key represent the letters "Q" and "Z," a key within three key positions from the selected middle finger represents the letter "J," a key reachable within three key positions from the selected home key for the ring finger represents the letter "K," and keys within three key positions from the index finger home key represent the letters "X," "G," and "M"; wherein
- each linear row contains a maximum of seven alphanumeric keys; and wherein
- each alphanumeric key is located at most three key positions from a key in the central row.

5. A keyboard system, comprising:
- a keyboard shell with an outer surface having an opening therein for receiving a keyboard;
- a one-hand keyboard with plural keys arranged to facilitate date entry with an operator's right hand;
- a one-hand keyboard with plural keys arranged to facilitate date entry with an operator's left hand; and
- means for alternately positioning each of the right- and left-hand keyboards in the opening, and generally in the plane of the outer surface, the means comprising a keyboard support pivotally mounted in the opening, the right- and left-hand keyboards mounted on opposite sides of the support.

6. The keyboard recited in claim 2, wherein the keys have nominal 0.75-inch spacing in both horizontal and vertical directions, alternating six and seven keys in the juxtaposed linear rows from the lowest row to the uppermost row.

7. The keyboard recited in claim 6, wherein a subset of the alphanumeric keys comprises the alphanumeric keys, and wherein the maximum distance of the center of any alphanumeric key from the center of any home key is less than approximately 2 inches.

* * * * *